Aug. 28, 1956

D. H. BOND 2,761,083

END TURN SUPPORTS FOR ELECTRICAL MACHINES

Filed April 23, 1953

INVENTOR.
DONALD H. BOND

Aug. 28, 1956 D. H. BOND 2,761,083
END TURN SUPPORTS FOR ELECTRICAL MACHINES
Filed April 23, 1953 2 Sheets-Sheet 2
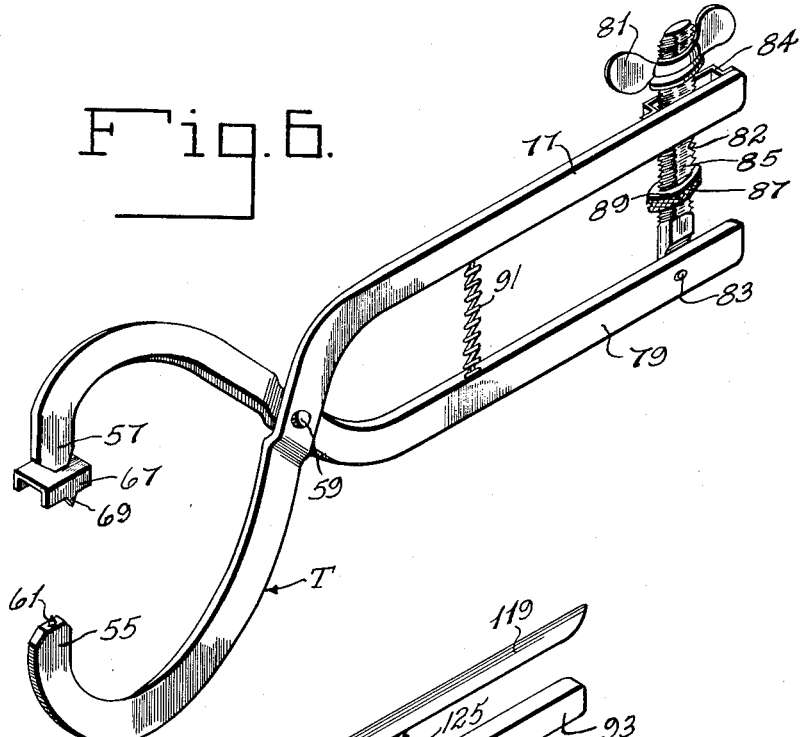
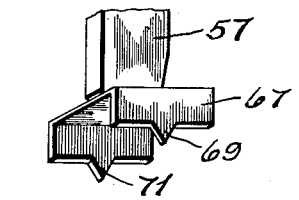
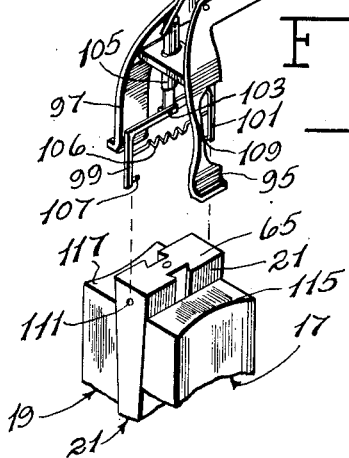
INVENTOR.
DONALD H. BOND

United States Patent Office 2,761,083
Patented Aug. 28, 1956

2,761,083

END TURN SUPPORTS FOR ELECTRICAL MACHINES

Donald H. Bond, Houston, Tex., assignor, by mesne assignments, to The Texas Pipe Line Company, Houston, Tex., a corporation of Texas Application April 23, 1953, Serial No. 350,712

19 Claims. (Cl. 310—260)

The present invention relates to a lovel method of and apparatus for supporting the conductor end turns of such electrical machines as motors and generators wherein the end turns project as loops from the ends of slots in the stator. Additionally, the invention concerns novel tools for applying the apparatus of the invention, and for disassembling such apparatus when necessary.

In the construction of electrical machines such as certain types of motors and generators it is customary to place preformed coils of electrical conductors in longitudinal slots of a stator core. The ends of the coils then extend out longitudinally beyond each end of the stator as loops, which in the past have been manually lashed together and to a retaining ring on the machine with cord.

When end turns are lashed with cord the lashings tend to become loosened and sometimes the cords are severed after the electrical machine has been in operation for a year or so, especially in large motors such as those of 500 horsepower capacity and greater. Such failures probably occur because the hand lashing method does not produce equal tautness of all binding cords nor equal spacing of the end turns, the result being the generation of unequal magnetic forces in or between the several end turns which creates a tendency for movement of the end turns, especially during the starting period when exceedingly large electrical currents are carried by the stator coils.

In accordance with the present invention there is provided a novel method for rapidly and easily binding firmly in position with equal spacings the end turns projecting from the core of an electrical machine. Spacer blocks are positioned between adjoining conductors of circumferentially spaced end turns, at least some of the spacer blocks comprising relatively movable coacting wedges, and then the circumference of the circle upon which the end turns and the blocks lie is expanded by relatively moving the wedges so as to move the conductors farther apart. The method also includes providing an abutment ring on the electrical machine surrounding, and of greater circumference than, the initial circle of the end turns, and wedging the end turns apart until the spacer blocks abut firmly against the abutment ring to assure a firm and rigid support.

The foregoing method can be carried out by the novel apparatus of the present invention wherein the wedging means between the windings comprises in each instance a pair of outer wedge blocks engaging the adjoining conductors, and a central wedge block slidable lengthwise between the two outer wedge blocks to expand the space between end turns. It is advantageous for the several spacer blocks to be constructed of a material having a high di-electric strength, such as hard rubber or a thermosetting phenol formaldehyde resin.

The principles of the invention will be described more in detail below in connection with the drawings wherein:

Figure 6 is a perspective view showing a tool for installing wedge blocks;

Figure 7 is a perspective view of a part of the tool shown in Figure 6; and

Figure 8 is a perspective view showing a tool for disassembling the wedge block assembly.

Figure 1:
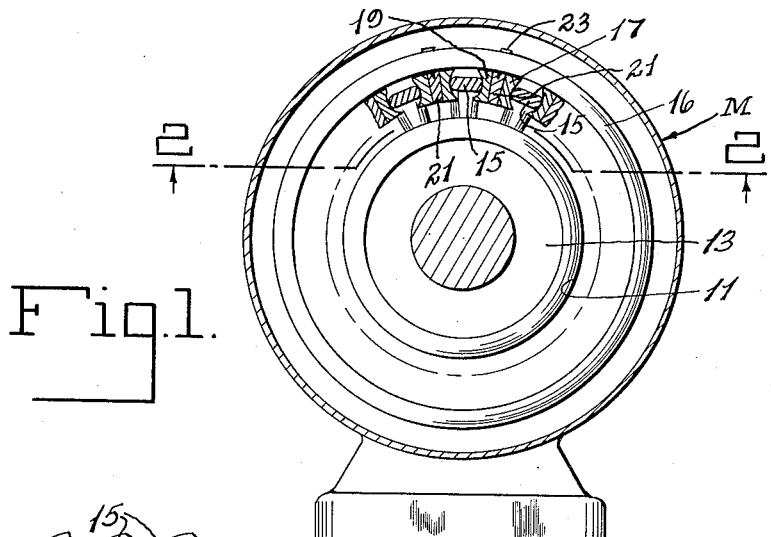
Figure 1 is an end elevational view, partly broken away and in section, showing a large electric motor employing the present invention.
Figure 2:
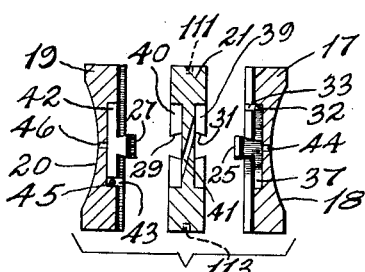
Figure 2 is a partial sectional view taken along the line 2—2 in Figure 1.

As shown in Figures 1 and 2 an electric motor M comprises a non-rotating stator core 11 and a rotating rotor 13. A plurality of electrical conductor windings 15 are positioned within stator slots in a conventional manner and project from the ends of the stator 11 as a plurality of end turns or loops. A ring 16 is mounted, as by brackets, at the end of the motor M in position to form an abutment for holding the end turns firmly in place when supported in accordance with the invention. Only one set of circumferentially spaced end turns is shown, for simplicity. However, several sets of end turns may sometimes be employed, and may be supported successfully in accordance with the invention.

For securing the end turns 15 rigidly in position a pair of outer wedge blocks 17 and 19 are positioned between, and with their outside faces 18 and 20 in contact with the adjoining conductors of each pair of end turns. Contact faces 18 and 20 advantageously are longitudinally concave so as to hug the conductors closely, and may be roughened or serrated for friction. A central wedge block 21 is slidably positioned between the two outer blocks in position to be moved lengthwise thereof so as to change the spacing between the conductors. Similar wedge blocks are positioned loosely between all adjoining conductors around the circumference of the motor after which the central wedge blocks are advanced between the outer wedge blocks so that the circle upon which the end turns and blocks all initially lie expands in circumference until the several wedge block assemblies abut tightly against the inner periphery of ring 15. In this position further rigidity may be assured, if desired, by securing the wedge assemblies to ring 16, as by inserting screws 23 through the ring and into central block 21. Additionally, or alternatively, the wedge block assemblies and end turns can be secured to ring 15 and to each other by lashing them with cords. If movement of the end turns circumferentially of the conductor should later occur, the wearing action will be on the wedge blocks rather than on the insulation of the conductors.

Figure 3:
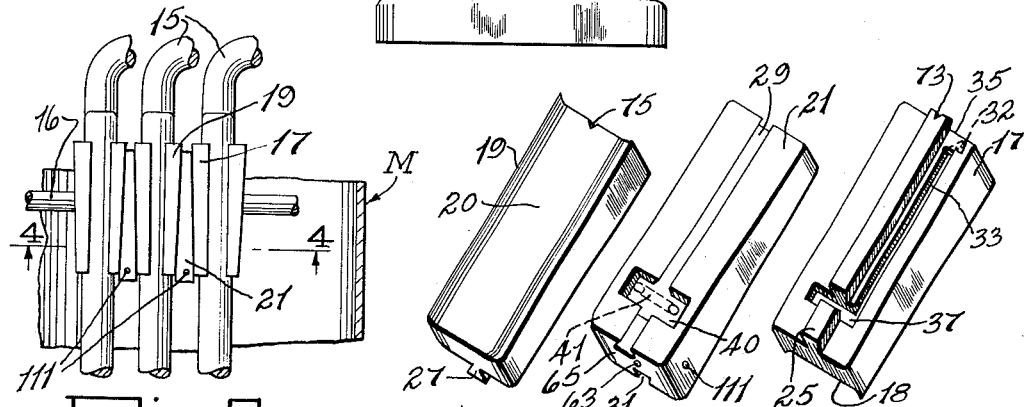
Figure 3 is an exploded perspective view showing details of three cooperating wedge blocks in accordance with the invention.
Figure 4:
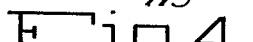
Figure 4 is an exploded cross-sectional view showing details of three cooperating wedge blocks, taken along the line 4—4 in Figure 2.
Figure 4:
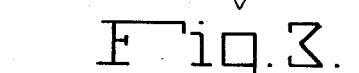

The wedge blocks of the invention are shown more in detail in Figures 2 to 4. As shown in Figure 2 the two identical outer wedge blocks 17 and 19 advantageously are tapered in one direction, and the central wedge block 21 is tapered in the opposite direction so that when the three wedge blocks are fitted together the adjoining conductors 15 remain substantially parallel.

Rigidity of conductors and stability of wedge block assemblies are further assured by constructing the wedge blocks with mutually cooperating tongue and groove joints. For example, each of the outer blocks 17 and 19 is provided with a central longitudinally extending bevelled undercut tongue 25 and 27 projecting from its inner face to fit within corresponding bevelled grooves 29 and 31 in the outer faces of central block 21, thus interlocking the three blocks.

Stability can also be further assured by securing the inner and outer blocks to one another after they have been adjusted properly. One method for accomplishing this is to introduce a liquid adhesive material such as quick-setting glue or plastic cement between the coacting surfaces in such a way as to act as a binder and key to hold the blocks in adjusted position. As shown in Figures 3 and 4, one outer block 17 has a short access duct 32 for adhesive extending from an opening in the wide end 35 of the block into a longitudinally extending off-center channel 33 in its inner surface which conducts liquid adhesive to a lateral cavity 37 in the same surface. The central wedge block 21 has similar cavities 39 and 40 in its outer surfaces connected together by a slanting duct 41 so that adhesive from the channel 33 and cavity 37 enters both of the cavities 39 and 40. The inner face of the second outer block 19 is provided with a lateral cavity 42 similar to the cavity 37 and registering with the cavity 40 in the central block. As a result, when the adhesive material in the four lateral cavities of the three wedge blocks solidifies it forms a key preventing separation of the blocks except when considerable force is exerted. Access of liquid to the lateral cavities may be made easier by providing wedge block 19 with a longitudinal channel 43 and slanting access bore 45 similar to those of block 17.

Instead of the internal channels and liquid adhesive, the blocks may be anchored together by a screw or bolt positioned within a drilled hole in one block and bearing against the adjoining block or blocks, e. g., an expansion bolt may be located within a hole drilled into the central wedge block from one end so as to intersect its outer surfaces whereby the bolt abuts against both adjoining outer blocks.

Engagement of outer blocks 17 and 19 with conductors 15 may further be assured, by placing adhesive material between their outer surfaces and the conductors, as by injecting adhesive from the cavities 37 and 42 through ducts 44 and 46.

Figure 5:
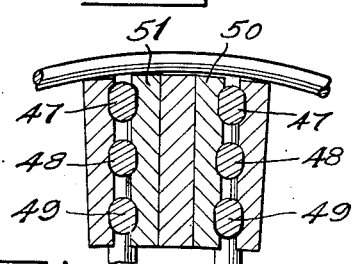
Figure 5 is an enlarged cross-sectional view showing a modified form of the apparatus of the invention.

Figure 5 shows a construction wherein the electrical machine has three radially spaced sets of windings 47, 48, and 49 instead of the single set described above. The principles are the same, the main difference being that the outer blocks 50 and 51 are provided with laterally spaced cavities to receive the several conductors and hold them in fixed spaced relationship.

The wedging devices described in detail above may be used to brace, separate, and hold rigid parallel conductors whether or not arranged in a circle and opposite a lashing ring. Where one conductor is lashed to an adjoining conductor a wedge assembly may be placed loosely between the conductors during the lashing operation, and thereafter expanded to develop uniform tautness of the lashings. Also it is often possible to secure conductors by using fixed spacer blocks between some pairs and interspersing cooperating wedges among them, e. g., by alternating fixed blocks and wedges around the circumference of a motor.

Wedging assemblies may be installed by driving the wedge blocks together, or by employing the special tool T shown in Figures 6 and 7. If the co-acting surfaces of the wedge blocks are smooth no difficulty should be encountered. Powdered talc may be used for lubrication if desired.

The tool T resembles a pair of tongs, having a pair of opposed jaws 55 and 57 which are pivotly mounted at 59 for movement toward and away from one another. The jaw 55 is provided with a projecting boss 61 adapted to fit within a recess 63 in the thick outer end 65 of inner wedge block 21 (see Figure 3). The other jaw 57 is provided with a U-shaped bridge plate 67 which is loosely mounted on the jaw, as by a rivet (not shown), for rotation and for a limited amount of tilting movement to permit the tool to be tilted to any position during installation of the wedges and to assure that the bridge plate will bear solidly against the wedge blocks regardless of the spacing. A ball and socket connection also may be used. Bridge plate 67 has a pair of spaced projecting bosses 69 and 71 adapted to fit within a pair of mating lateral grooves 73 and 75 in the thick ends of the outer wedge blocks 17 and 19 while bridging the space between the blocks.

The jaws 55 and 57 are provided with a pair of lever arms 77 and 79 which extend substantially parallel to one another from the pivot 59 so that movement of the lever arms toward one another moves the jaws 55 and 57 together and exerts great force upon the cooperating wedge blocks to force the central wedge block 21 into position between the outer blocks 17 and 19. Expansion of the space between blocks 17 and 19 is permitted by the bosses 69 and 71 sliding within the cooperating grooves 73 and 75.

The lever arms 77 and 79 can be moved together in any desired way, as by tightening a wing nut 81 on a threaded adjustment bolt 82 which is riveted at end 83 to the arm 79 and extends at its opposite end through a bracket 84 cooperating with handle 77 to act as abutments against which the wing nut may press. One side of the bolt 82 is flattened as at 85 and provided with a scale for showing the spacing of the jaws 55 and 57. A stop nut 87 is threaded on the bolt 82 and is movable to any selected position in accordance with the scale to assure that all wedge assemblies are similarly adjusted. Stop nut 87 can be fixed in the selected position by one or more set screws 89. A spring 91 acts to separate the jaws 55 and 57 when the wing nut 81 is unscrewed from the bolt 82.

At times it may be necessary to separate the wedge blocks before or after they are secured together, as for the repair or replacement of parts. The tool S shown in Figure 8 can be effectively used for this purpose. Tool S comprises a long handle 93 having a U-shaped yoke comprising a pair of laterally spaced approximately parallel abutment members 95 and 97 extending at right angles from one end thereof. Between the abutment members 95 and 97 there is located a pair of right angled opposed jaws 99 and 101 which have ends pivoted together and to a connecting rod 105 at 103 so as to move toward and away from one another. A spring 106 tensioned between the jaws 99 and 101 urges them together. A pair of pins 107 and 109 project toward one another from the jaws 99 and 101 for engaging a pair of mating holes 111 and 113 located in opposite side edges of the central wedge block 21. The holes 111 and 113 preferably are inclined inwardly at a slight angle toward the thick end 65 of wedge block 21, and the pins correspondingly, to assure that the pins will remain in the holes when withdrawing the central wedge block in the manner to be described.

Once the pins 107 and 109 have been inserted within the holes 111 and 113 and the ends of the abutment members 95 and 97 have been positioned against the ends 115 and 117 of the outer blocks 17 and 19 a strong pull is transmitted to the connecting rod 105 by means of a hand lever 119 pivoted to handle 93 at 120 and acting through a connecting link 121 which is pivotally connected at one end to the lever and at its opposite end to a bell crank 123 coupled to the end of connecting rod 105 and pivoted at 122 to handle 93. A spring 125 separate the handle 93 and lever 119 when pressure is relaxed.

Obviously many modifications and variations of the invention as hereinbefore set forth may be made without departing from the spirit and scope thereof and therefore only such limitations should be imposed as are indicated in the appended claims.

I claim:

1. A method for binding firmly in position the end turns of an electrical machine which are arranged on the circumference of a circle, said method comprising positioning spacing blocks between the adjoining conductors of each pair of circumferentially spaced end turns, at least some of said blocks comprising relatively movable coacting wedges; providing an abutment ring surrounding, and of greater circumference than, said circle; and expanding the circumference of said circle by relatively moving said wedges so as to move the adjoining conductors farther apart until said spacing blocks touch said abutment ring.

2. An electrical machine comprising a core; annularly arranged spaced end turns projecting endwise from said core; and spacing blocks disposed between each pair of adjacent conductors of said circumferentially spaced end turns and coacting with said end turns and with one another to bind said end turns together, at least some of said spacing blocks comprising wedging means, said wedging means comprising a pair of outer wedge blocks between a pair of adjacent conductors and in contact therewith, and a central wedge block between said outer wedge blocks.

3. An electrical machine in accordance with claim 2 wherein said outer wedge blocks are concave to fit said conductors.

4. An electrical machine in accordance with claim 3 wherein said outer wedge blocks are concave at a plurality of radially spaced points to receive a plurality of radially spaced conductors.

5. An electrical machine in accordance with claim 2 wherein said outer wedge blocks taper in the same direction, and said central wedge block tapers in the opposite direction.

6. An electrical machine in accordance with claim 2, also comprising a ring adjacent the outer circumference of said end turns, said spacing blocks abutting against said ring for holding said end turns rigid.

7. An electrical machine in accordance with claim 6, also comprising means securing said spacing blocks to said ring.

8. An electrical machine in accordance with claim 2 wherein said wedge blocks have mutually cooperating tongue and groove joints for holding said wedge blocks rigidly in position.

9. An electrical machine in accordance with claim 2, also comprising means for holding said central block and said outer blocks together in adjusted position.

10. An electrical machine in accordance with claim 9 wherein said last-named means comprises registering cavities in said central wedge block and said outer wedge blocks, and solidified adhesive filling said cavities and keying said blocks, together.

11. An electrical machine in accordance with claim 10, also comprising passage means extending from said registering cavities to the outside of one of said wedge blocks, whereby fluid adhesive can be injected after said wedge blocks are adjusted in position.

12. An electrical machine in accordance with claim 11 wherein said registering cavities are formed by shallow recesses in the mating surfaces of said central block and each of said outer blocks, and wherein said central block has a cross duct connecting together the shallow recesses in opposite surfaces thereof.

13. An electrical machine in accordance with claim 2 wherein said outer and central wedge blocks have recesses therein for engaging tools for assembling and disassembling said wedging means.

14. A device for securing a series of electrical conductors in rigidly spaced relationship comprising a pair of outer wedge blocks having concave outer surfaces to fit said conductors, and a central wedge block adapted to fit between said outer wedge blocks for urging the latter into engagement with said conductors.

15. A device in accordance with claim 14 wherein said outer wedge blocks taper in one direction, and said central wedge block tapers in the opposite direction.

16. A device in accordance with claim 14, wherein said wedge blocks have mutually cooperating tongues and grooves for holding said blocks rigid.

17. A device in accordance with claim 14, wherein said central and outer wedge blocks have registering cavities in the adjoining faces thereof, and wherein passage means extends from said cavities to the outside of at least one of said blocks whereby fluid material can be injected into said cavities.

18. A tool for disassembling a wedging assembly comprising a central wedge block positioned between a pair of outer wedge blocks, said central wedge block and said pair of outer wedge blocks being relatively movable lengthwise away from one another out of wedging position, said tool comprising a pair of spaced abutment members for straddling the end of said central wedge block and engaging the adjoining ends of said outer wedge blocks; a pair of opposed jaws between said abutment members movable toward one another for engaging opposite edges of said central wedge block adjacent said ends, said jaws also being movable in unison relatively to said abutment members in opposite directions lengthwise thereof; and means for effecting relative movement between said abutment members and said jaws whereby said central wedge block can be removed from between said outer wedge blocks.

19. A tool for installing a wedging assembly comprising a central wedge block positioned between a pair of outer wedge blocks, said central wedge block and said pair of outer wedge blocks being relatively movable lengthwise together into wedging position, said tool comprising a pair of opposed jaws movable toward and away from one another in a plane; a single boss projecting from one of said jaws toward the other of said jaws in said plane for engaging an end of such a central wedge block; the other of said jaws having a plate loosely mounted thereon for rotation and for limited tilting movement, said plate having a pair of spaced bosses projecting therefrom toward said single boss on opposite side of said plane for simultaneously engaging the ends of both of such outer wedge blocks remote from said end of said central wedge block; and means cooperating with said jaws for urging said jaws toward one another to force said wedge blocks into wedging position.

References Cited in the file of this patent

UNITED STATES PATENTS

| | | |
|---|---|---|
| 950,849 | Hammond | Mar. 1, 1910 |
| 1,454,475 | Hughes | May 8, 1923 |
| 1,752,267 | Stephens | Mar. 25, 1930 |
| 2,291,413 | Siebrandt | July 28, 1942 |
| 2,301,079 | Phipps | Nov. 3, 1942 |
| 2,583,896 | Siebrandt | Jan. 29, 1952 |